United States Patent
Peri-Glass et al.

(10) Patent No.: US 8,799,867 B1
(45) Date of Patent: Aug. 5, 2014

(54) METHODS, SYSTEMS, AND ARTICLES OF MANUFACTURE FOR SYNCHRONIZING SOFTWARE VERIFICATION FLOWS

(75) Inventors: Yaron Peri-Glass, Raanana (IL); Shabd Swarup V, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 388 days.

(21) Appl. No.: 12/796,361

(22) Filed: Jun. 8, 2010

(51) Int. Cl.
*G06F 9/44* (2006.01)

(52) U.S. Cl.
USPC ............ 717/126; 717/100; 717/104; 717/109

(58) Field of Classification Search
CPC ......... G06F 9/44589; G06F 8/10; G06F 8/20; G06F 8/34
See application file for complete search history.

(56) References Cited

U.S. PATENT DOCUMENTS

| | | | |
|---|---|---|---|
| 5,600,789 A | 2/1997 | Parker et al. | |
| 5,918,037 A | 6/1999 | Tremblay | |
| 6,854,089 B1 | 2/2005 | Santee et al. | |
| 6,944,848 B2 | 9/2005 | Hartman | |
| 7,024,345 B1 | 4/2006 | Stamm | |
| 7,774,746 B2 * | 8/2010 | Mansfield et al. | 717/106 |
| 7,827,532 B2 | 11/2010 | Rosaria | |
| 7,913,231 B2 | 3/2011 | Stienhans | |
| 7,958,454 B2 | 6/2011 | Gaudette | |
| 8,387,005 B1 * | 2/2013 | Ghosh-Roy et al. | 717/109 |
| 8,433,550 B2 | 4/2013 | Theaume | |
| 8,510,718 B2 * | 8/2013 | Hemade | 717/126 |
| 8,549,483 B1 * | 10/2013 | Bridges et al. | 717/126 |
| 2002/0156608 A1 | 10/2002 | Armbruster et al. | |
| 2006/0156274 A1 * | 7/2006 | Andreev et al. | 717/100 |
| 2007/0033441 A1 * | 2/2007 | Sathe et al. | 714/38 |
| 2008/0052690 A1 | 2/2008 | Bharadwaj | |
| 2008/0263506 A1 * | 10/2008 | Broadfoot et al. | 717/104 |
| 2008/0263511 A1 * | 10/2008 | Shapiro | 717/104 |
| 2009/0089725 A1 * | 4/2009 | Khan | 716/5 |
| 2010/0162214 A1 * | 6/2010 | Hoff | 717/126 |
| 2010/0211934 A1 * | 8/2010 | Simons et al. | 717/126 |
| 2011/0173603 A1 | 7/2011 | Nakamura et al. | |

FOREIGN PATENT DOCUMENTS

EP  1372086 A1  12/2003

OTHER PUBLICATIONS

Sakunkonchak et al., Synchronization verification in system-level design with ILP solvers, Jul. 2005, 10 pages.*
Non-Final Office Action for U.S. Appl. No. 12/143,174 Mailed on Jul. 31, 2012.
Edwards, Stephan A., "Design and Verification Languages", Nov. 2004.

(Continued)

*Primary Examiner* — Thuy Dao
(74) *Attorney, Agent, or Firm* — Vista IP Law Group, LLP

(57) ABSTRACT

Disclosed are methods, systems, and articles of manufacture for synchronizing a software verification flow of an application that uses a user interface. Various embodiments comprise implementing a menu item as a widget and identifying an operation associated with the menu item. A synchronizer is further identified or created for the operation and then registered with the operation such that the synchronizer is activated when the operation is invoked during the software verification flow. Once activated, the synchronizer takes over control of the verification flow and prevents the verification flow from proceeding until a criterion is fulfilled. The synchronizer may be reused among different tests, and the same test case may be rerun on different machines with different computing performance and workloads without producing false positives or false negatives.

27 Claims, 14 Drawing Sheets

(56) References Cited

OTHER PUBLICATIONS

Mark S. Miller, "Block Structure", 1999, URL: http://www.erights.org/elang/blocks/index.html.
Mark S. Miller, "Expression Grammar", 1999, URL: http://www.erights.org/elang/grammar/expr.html.
Mark S. Miller, "Kernel-E Reference", 1999, URL: http://www.erights.org/elang/kernel/index.html.
Mark S. Miller, "Lexical Grammar", 1999, URL: http://www.erights.org/elang/grammar/lexical.html.
Mark S. Miller, "Methods and Matchers", 1999, URL: http://www.erights.org/elang/grammar/dispatchee.html.
Mark S. Miller, "Pattern Grammar", 1999, URL: http://www.erights.org/elang/grammar/patterns.html.
Mark S. Miller, "Primitive Expressions", 1999, URL: http://www.erights.org/elang/grammar/prim-expr.html.
Mark S. Miller, "Quasi-Literals", 1999, URL: http://www.erights.org/elang/grammar/quasi-overview.html.
Verisity, "e Language Reference Manual", 1998.
Final Office Action dated Dec. 5, 2012 for U.S. Appl. No. 12/143,174.
Non-Final Office Action dated Apr. 11, 2013 for U.S. Appl. No. 12/143,174.
"RTL Hardware Desing Using VHDL: Coding for Effeiency, Portability, and Scalability" by Pong P. Chu, Jun. 12, 2006, p. 313, [online],[retrieved on Mar. 20, 2013]. Retrieved from <http://academic.csuohio.edu/chu_p/rtl/chu_rtl_book!rtl_chap1 O_fsm.pdf>.
IEEE, "http://academic.csuohio.edu/chu_p/rtl/chu_rtl_book!rtl_chap1 O_fsm.pdf" by Tsun S. Chow, Sep. 18, 2006, pp. 1-10, [online], [retrieved on Mar. 20, 2013]. Retrieved from <http://ieeexplore.ieee.org/stamp/stamp.jsp?tp=&arnumber=170251 9>.
Yuanhua Liu, Anna-Lisa Osvalder and MariAnne Karlsson (201 0). Considering the Importance of User Profiles in Interface Design, User Interfaces, Rita Matrai (Ed), InTech, Available from: http://www.intechopen.com/books/user-interfaces/considering-the-importance-of-userprofiles-in-interfacedesign. Last retrieved Jul. 26, 2013.
World of Computing, Artificial Intelligence, Heuristic Search, Dec. 14, 2009, last retrieved from http://intelligence.worldofcomputing.net/ai-search/heuristic-search.html# on Jul. 26, 2013.
World of Computing, Artificial Intelligence, Depth First Search, Dec. 18, 2009, last retrieved from http://intelligence.worldofcomputing.net/ai-search/depth-first-search.html on Jul. 26, 2013.
Architecture for Automated Graphical User Interface Tests to Maximize Reuse, IBM, Jun. 30, 2006, IPCOM000137946D.
Non-Final Office Action dated Aug. 1, 2013 for U.S. Appl. No. 12/796,387.
Final Office Action dated Feb. 13, 2014 for U.S. Appl. No. 12/796,387.
Final Office Action dated Oct. 2, 2013 for U.S. Appl. No. 12/143,174.

\* cited by examiner

METHODS, SYSTEMS, AND ARTICLES OF MANUFACTURE FOR SYNCHRONIZING SOFTWARE VERIFICATION FLOWS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION(S)

The present application is related to U.S. application Ser. No. 12/143,174, filed on Jun. 20, 2008, entitled "METHOD AND SYSTEM FOR TESTING AND ANALYZING USER INTERFACES" and U.S. App. Ser. No. 12/796,387, filed concurrently, entitled "METHODS, SYSTEMS, AND ARTICLE OF MANUFACTURE FOR SYNCHRONIZING SOFTWARE VERIFICATION FLOWS" with the contents of which are hereby incorporated by reference in its entirety.

BACKGROUND

The invention is directed to an improved approach for testing and verifying applications under test with user interfaces. Most computing devices, applications, and complex tools rely upon a user interface to interact with, receive input from, and provide information to users. There are many types of user interfaces. Common approaches to implement user interfaces include the graphical user interface (GUI), character user interface (CUI), and web-based user interfaces.

Like any other development process for a complex design, it is important to ensure that the process for developing a user interface involves adequate testing and verification of the performance and functionality of the interface components. In the field of computer science, GUI software testing is the process of testing a product that uses a Graphical User Interface (GUI), to make sure it meets its written specifications. This is normally done through the use of a variety of test cases, in addition to ad-hoc methods involving human interaction.

There are two conventional approaches which battle the synchronization issues. The first is a sleep statement approach which inserts a delay, by using a sleep statement, in the test case. The idea behind inserting the delay is to give the application some time to complete execution of the action it is performing. Abstractly speaking, the test is waiting for some time with the "hope" that some condition will be fulfilled by then. The other is a WaitFor statement approach. A waitFor statement is also a form of a delay but it is not simply a time based delay but it waits for the state of the GUI to change. The tester or verification engineer may need to write some logic to identify the particular state that the test must wait for in order to fulfill the synchronization requirements of the component-operation.

In a typical GUI verification or testing, a tester or verification engineer often adopts the record-replay mechanism which records all the actions in the sequence that the tester performs and generates a script that may be subsequently replayed. Some record-replay tools employ the approach of automatically inserting sleep statements in the generated scripts to record the time-lag between two successive user operations. By using the sleep statements, the test tool is trying to encapsulate the state change of the GUI into a certain amount of time. The event recorder of the tool then inserts sleep statements into the script. These sleep statements make the script sleep for a specified amount of time.

The test tool then tries to ensure that the script is replayed in the same speed as it was recorded by the tester. So if the tester, while recording, waited for e.g. a window to pop up, the script will do the same. Nonetheless, this approach often tends to overkill the amount of sleep time in order to eliminate failures due to insufficient amount of waiting time. In other words, these tests tend to wait for longer periods of time than necessary. Moreover, this approach is often unstable because the specified amount of sleep time may be insufficient when slower testing systems are used for these tests. In addition, this approach may be unreliable by passing certain operations that should have failed or by failing certain operations that should have passed because there is no mechanism to check to see whether the previous operation has indeed completed.

The WaitFor approach instructs the test case to wait for a certain GUI component to change state or for some condition to be fulfilled rather than waiting for a certain period of time. In this approach, the tester is required to identify the component-operation that signifies the completion of the task and manually insert these WaitFor statements in the test case at the required locations. The test will then wait for whatever condition is provided with the statement to fulfill, before moving on to the next step in the test. These WaitFor statements could either wait for a specific GUI component to exist and be accessible or wait until a specific condition becomes true.

Nonetheless, the WaitFor statement in the above test case must be inserted manually as it requires identification of the state to wait for. In other words, the same WaitFor statement will need to be manually inserted in all places that require the test case to wait for the change of state or fulfillment of condition. This approach is thus impractical and prone to error due to the fact that there may be a large number of scenarios to be tested. This approach also requires the tester or the verification engineer to possess the knowledge of how and where to make the necessary changes. This approach also consumes a lot of computing resources because the same logic in the WaitFor statements will be duplicated many times in a test case. This approach also causes maintainability issues when there are changes in the logic for the WaitFor statements because such changes need to be replicated in all required places in a test case. In addition, this approach completely fails in cases of monkey testing or random scenario generation where the test tool is required to perform actions randomly because the randomly generated tests will not include such WaitFor statements.

SUMMARY

Disclosed are various embodiments of methods, systems, and articles of manufactures for synchronizing software verification flows during testing of an application that uses a user interface (UI). It shall be noted that the terms UI and GUI may be used interchangeably throughout this application to represent the user interface of an AUT despite the differences between them. In other words, the use of UI in the instant application is intended to cover both user interfaces and graphical user interfaces. Likewise, the use of GUI in the instant application is intended to cover both user interfaces and graphical user interfaces.

In a single embodiment or in some embodiments of the method or the system comprises the acts or modules of identifying a menu item of the user interface to be tested and implementing the menu item as a widget if the menu item is determined not to have been so implemented. The method or the system further comprises the act or module of identifying a component operation, the act or module of identifying or creating a synchronizer for the component operation, and registering the synchronizer with the component operation such that the synchronizer is activated when the component operation is invoked during the software verification flow. The method or the system may also comprise activating the synchronizer pre-event or activating the synchronizer post-event, if any.

The act or module of creating the synchronizer further comprises defining one or more commands to which the synchronizer listens and defining the wait logic within the synchronizer struct. The synchronizer is defined once for the same component operations invoked throughout the entire software verification flow and may be stored in a central repository in order to be reused for rerunning the same software verification flow or for running other software verification flows requiring the same or similar component operation. The act or module of creating the synchronizer further comprises registering the synchronizer as a listener to a widget by defining a method to instantiate a new instance of the synchronizer struct and passing the instance to an interface or method for adding the synchronizer to a widget. The method or the system further comprises the act or module of implementing a menu item of the user interface as a widget.

More details of the methods or systems for synchronizing software verification flows during testing of an application that uses a user interface (UI) will be described in subsequent paragraphs with references to various figures for explanation and illustration purposes.

BRIEF DESCRIPTION OF THE FIGURES

The drawings illustrate the design and utility of preferred embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
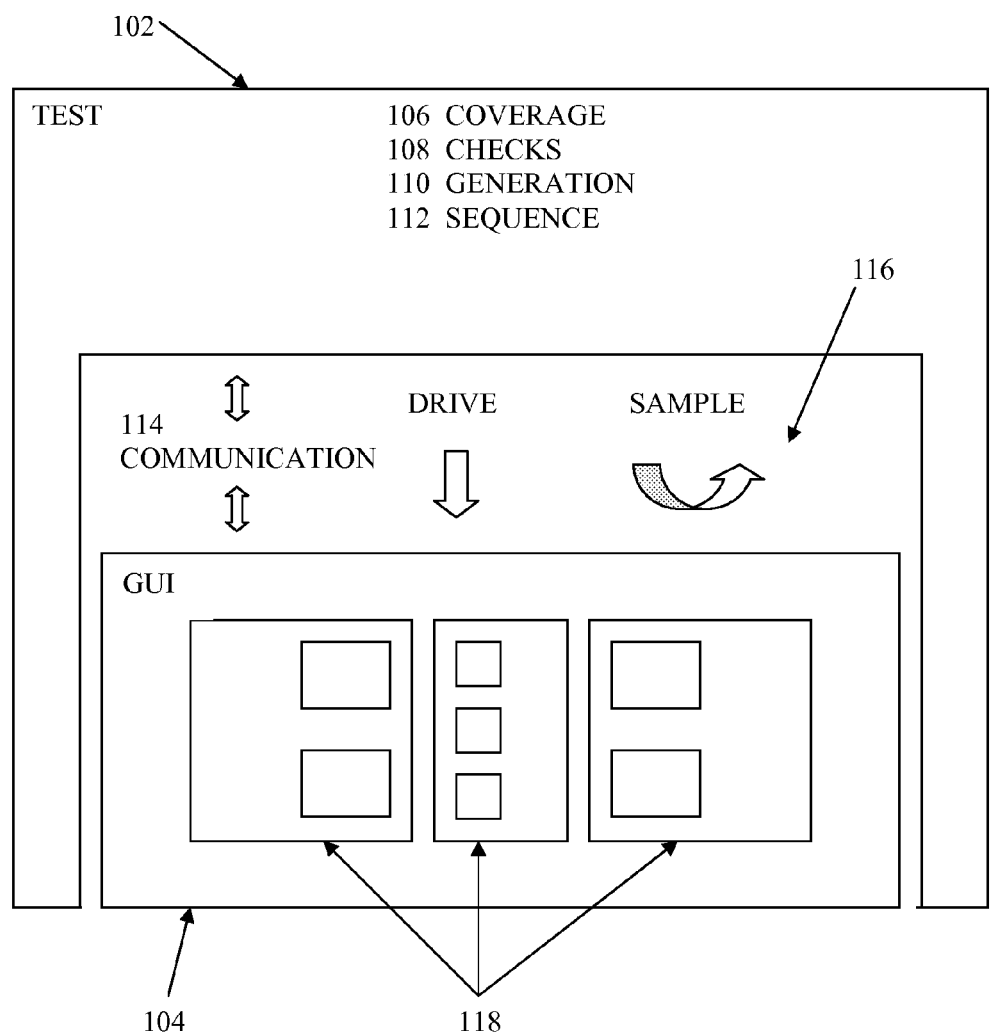
FIG. 1 illustrates a high-level diagram of the architecture for performing interface testing according to some embodiments.

Various embodiments of the invention are directed to a method, system, and computer program product for implementing hotspot detection, repair, and optimization of an electronic circuit design in the single embodiment or in some embodiments. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Various embodiments are directed to take on various challenges confronting the testing or verification of an application under test (AUT). Some of the challenges of an AUT that uses a GUI are synchronization or timing—whether or not the AUT is ready to receive a command from a test—case. That is, the test case may have assumed that the application under test has completed the previous operation or task and is ready to receive the next operation or task while the AUT is busy and is thus not ready to receive such operations or tasks. These challenges are further exacerbated by the fact that no GUI application is designed to interact with a computer program and thereby lacks the ability to notify the computer program that is has completed execution of a certain operation or task and is ready to receive the next operation or task. In a case where such synchronization or timing issues occur, the test may fail because the AUT is busy with certain operations or tasks and is thus unable to respond to the next operation or task sent by the test case. Often, the operations or tasks that the AUT is busy with may be trivial—such as waiting for a window to pop up or enabling or disabling a button on the GUI. Of course, the operations or tasks that keep the AUT busy may also be some complex operations such as database transactions.

Note that these operations or tasks are executed on or in relation to a UI component such as a GUI menu item, these tasks and operations will be collectively referred to as a component operation or component-operation in this Application.

For example, suppose the test case has the following two commands in sequence: (1) click button; (2) read text from new window. The test case follows the sequence of commands and moves to step (2) almost instantly after step (1) has been executed on the AUT. It is important to note here that the test case assumes that (1) has completed execution and the application under test is ready to receive the next command. This, almost always, will not be the case because the new window may take some time to load before which the application may not receive any further commands. Thus, the test fails when the test case sends command (2) to the AUT while the AUT is still, for example, waiting for (1) to complete execution.

The synchronization or timing (hereinafter synchronization) issues may also give rise to other issues which are also resolved by various embodiments. For example, with continuous modifications and advancement in the application, it is quite possible that some tests which were running smoothly in one version break in another version due to the differences in timing of certain events that the test case is trying to verify. For instance, a window that was loading static data earlier now retrieves data from a database and thus may take a longer time to achieve the same purpose. While the test is trying to verify the same functionality (of reading the data on the window, for example), the test may fail due to the difference in the time required for fetching the data from the database server.

Another class of issues addressed and resolved by various embodiments is one that may also arise due to synchronization issues is related to reliability. Certain tests may be largely dependent on the performance or workload of the system which the tests perform on (such as a GUI verification system) or require for the completion of the test (such as a database server that some test cases may require for the completion of the test cases). Thus, there is high probability that these tests may fail if these test are subsequently replayed on a slower machine or even on the same machine but with higher workload due to the execution of other processes or performance of other tasks.

In addition, the third class of issues addressed and resolved by various embodiments is one that may arise out of the synchronization issues is incompleteness. There exist some scenarios which may be left out because a test case cannot cater to the synchronization issues.

FIG. 1 shows a high level architectural view of some embodiments of the invention that include a testbench 102 and an application under test (AUT) 104. The AUT 104 comprises a GUI/CUI having numerous GUI/GUI elements 118 (hereinafter user interface or UI). The coding of the testbench 102 is used to drive and stimulate the GUI elements 118 within the AUT 104. As the testbench 102 is executed, it communicates with the GUI for the Application Under Test 104 via a communications channel 114. Data sampling is performed to collect the data 116 representing results of stimulating the AUT 104 with the testbench 102.

According to some embodiments, an electronic design verification environment may be used to implement the architecture of FIG. 1. A Hardware Verification Language (HVL) is modified and extended such that, instead of interfacing with simulation of a hardware device modeled in a language such as Verilog or VHDL, it instead interfaces with the Graphical/Character User Interface (GUI/CUI) 118 of the target AUT 104. The testbench 102 in the verification language then drives the AUT 104 by generating and providing a GUI/CUI stimulus which emulates user behavior or external behavior, by collecting AUT status and optionally GUI status, and by comparing the identified status against an expected status. In one embodiment, the testbench 102 may be implemented using the "e" language, specifications. A suitable verification environment may be provided by, for example, the Specman tool. Other verification languages and environments may also be used in conjunction with, and within the spirit of, the invention.

The advantage of using a HVL is that the process of performing UI testing implicates many similar problems that have been faced in the past by ASIC designers, who were forced to use Hardware Description Languages (HDL's) such as Verilog and VHDL to test their hardware designs. The verification engineers found the levels of abstraction allowed for by these languages to be insufficient, which forced the evolution of a new class of languages dedicated to verification of hardware designs. The resulting HVLs, e.g., the "e" language, introduced higher order constructs for dealing specifically with verification problem.

In similar spirit, the invention described herein addresses the issue of software application and UI testing at a much higher level of abstraction than allowed for by the commonly employed tools. Language features of HVL's are employed, along with appropriate improvements and extensions to render said HVL's and their associated regression management and analysis environments applicable to UI testing. Use of a HVL-like approach to UI testing as described herein will allow the UI verification engineer to use a language, which is designed for complex state and sequence testing, for the authoring of UI test cases, including their abilities to write constraint-based randomized tests in addition to directed tests.

Various embodiments as described herein may be employed in conjunction with regression management and test plan authoring tools to allow UI verification personnel to define exactly what they want to verify, to write and formally capture a verification plan, and formally define the required coverage points. The vManager product, which is well known in the field, is an exemplary tool that may be used in conjunction with the invention used to perform regression management in a UI-testing environment and to allow engineers to create a testbench 102.

Using a test plan regression manager also allows the software verification or quality assurance engineer to set up a targeted regression involving multiple tests, to run regressions using the same tests with multiple seeds (which control the random number generation process), to analyze the regression results in terms of passed/failed checks, to automatically re-run failed checks while preserving the random seed as necessary, and finally to explicitly analyze and identify those areas of high UI state coverage and low or missing coverage. The tracked testing metrics provide feedback for the UI designers and product managers for the aim of robust product test and development.

As noted above, the testbench 102 communicates with the UI elements 118 in the AUT 104 using a communications channel 114. In some embodiment, the communications channel 114 is implemented via a socket connection, making it possible for the testbench execution and the AUT execution to be in separate operating system processes, or even on separate machines. Other forms of inter-process communication may also be used instead. In yet another embodiment, the testbench 102 and AUT components 118 may be combined within a single operating system (OS) process. The communications channel 114 provides a medium that facilitates the testbench 102 driving the AUT 104, and that allows the AUT 104 to respond to those events, in addition to providing query application programming interfaces (APIs) through which the testbench 102 can obtain UI object values (such as, for example, button state, values of text strings within a type in field) from the AUT 104.

The testbench 102 is configured to provide an improved approach to address test coverage 106. It is generally very difficult to know with any level of confidence or accuracy just how representative a set of UI tests are in terms of covering all of the possible states of a UI. With increasing functionality being provided in successive software releases, the number of valid UI states that can be arrived at for any given software application is exponentially increasing over time. To ensure a representative set of tests are used to achieve a decent level of state coverage, some embodiments of the invention provides the ability to measure or otherwise quantify the degree of UI state coverage provided by a testbench 102.

The testbench 102 can also be used to configure the checks 108 that are used to query and verify the operation and functionality of the UI 104 and its components 118. Examples of such checks 108 are described in more detail below.

One benefit of using a verification language (such as the "e" language) to author the testbench 102 includes the ability to generate 110 constrained (e.g., legal) random values and sequences of values. This effectively allows a test to be authored as a template, during the execution of which the template is realized into a sequence of concrete tests via a randomization process. A single test template may thus be used to generate a multitude of actual tests and scenarios during the run time of the tests, and exercise multiple "flavors" of the specified scenario.

Another benefit of the present approach is that sequencing 112 can be addressed using the testbench 102. This is extremely useful since some functionality of the AUT 104 may only be accomplishable by following a complex sequence of UI events. For example, to open a file a user may have to engage in a long sequence of operations that include clicking on the "File" menu, selecting the "Open" operation, using a dialog box to specify the file name, and then focusing the application on the newly opened window. This type of sequence can be specified in testbench 102.

These new schemes lead to tremendous increases in software application testing productivity, especially in the based applications, and present a vast reduction in the overhead required for release-to-release testcase maintenance. Though the examples described herein are with respect to UI's and UI verification, the reader will understand that these are intended to be exemplary only, and that the spirit of the invention as a whole is not limited to just that of UI verification and validation. Other complex state-based systems can equally be verified by a similar approach, with application-specific components being used to substitute the UI-specific components described herein during the augmentation or extension of existing or yet-to-be-determined Hardware Verification Languages.

Figure 2:
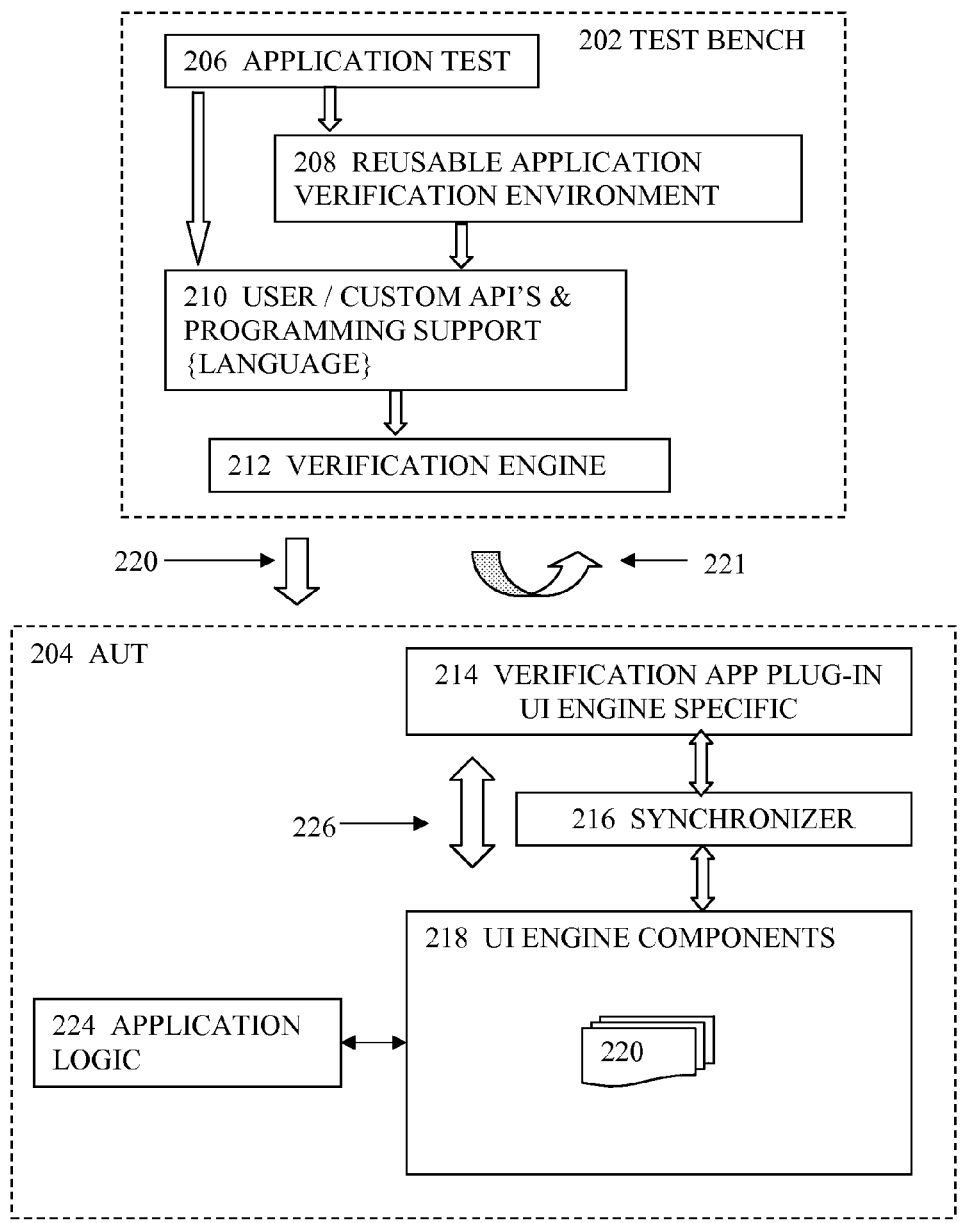
FIG. 2 illustrates a more-detailed diagram of the architecture for performing interface testing according to some embodiments.

FIG. 2 shows a more detailed diagram of an embodiment of the architecture for implementing some embodiments of the invention. The illustrated architecture includes two major components, the Testbench or "server" side 202 which generates the AUT drive/command (220) and sample/query (221) messages, and the AUT or "client" side 204 which receives and responds in kind to those messages. As used herein, the testbench side 202 may also be referred to as the "GTX" side or component.

The testbench "server" side 202 extends the standard HVL environment in two major areas. First, an API 210 is provided for driving (220) the UI of the AUT, and for sampling (221) the state of that UI. This API 210 may be implemented, for example, using the "e" programming language structs (classes) and methods. Second, a communications channel is provided that connects to the AUT. The server side API 210 is responsible for communication of the UI commands to the AUT client, and for making the results of UI queries available to the application test 206.

In addition to the "e" programming Language and GTX User/Custom API for UI Command/Query, UI verification engineers can define additional UI Verification IP in the form of, for example, a custom library or libraries, in user/custom API's and Programming Support 208, and specify coverage requirements, checks that are to be performed, sequences that are to be generated, or other testing attributes. In one embodiment, these components can be defined using the extended "e" programming Language.

The application test 206 is authored in the extended "e" programming language, and may either be written directly using the language extensions described via examples herein, or by instantiating/calling UI Verification IP stored in customer libraries, as described above, or both. The application test 206 may be configured to include calls to the API 210.

The combined form of the application test 206 and library extensions 208 may be processed by the verification engine 212 and used to send drive messages (220) to stimulate the UI application. The verification engine also sends query messages (221) to the UI application to gather information about the state of the UI.

On the application "client" side 204, a UI application is extended via incorporation of a Plug-in 214 such as a GTX Plug-In. The plug-in is a UI toolkit specific implementation which translates the UI drive commands (220) and query messages (221) from the testbench server 202 into actual calls (226) to the underlying UI toolkit. Each underlying type of application would correspond to a plug-in 214 that is configured to interface to the correct respective language. For example, plug-ins may be configured to translate the drive commands and query messages into Java, Qt, Tcl/Tk, or any other suitable interface format.

The plug-in would present the test messages into UI engine-specific method calls, such as button.click( ) text.get( ) and similar calls. Plug-ins 214 can be authored for any such GUI implementation/language. The plug-in 214 may comprise custom or standard plug-ins as provided by various verification tools. The plug-in 214 also implements the client side of the communications protocol, communicating the results of GUI Drive and Query commands back to the testbench "server" side 202. The UI Engine Components 218, which comprises various component names 220 for the respective components, interfaces with the application logic 224. One or more synchronizers 216 ensure that the application under test (AUT) is ready to receive various operations, commands, or tasks from the test bench and is registered with the UI engine components 218. Note that in some embodiments, the application under test may be run on a single computing node. In these embodiments, the single computing node comprises all the components of both the test bench 202 and the application under test 204.

Figure 3:
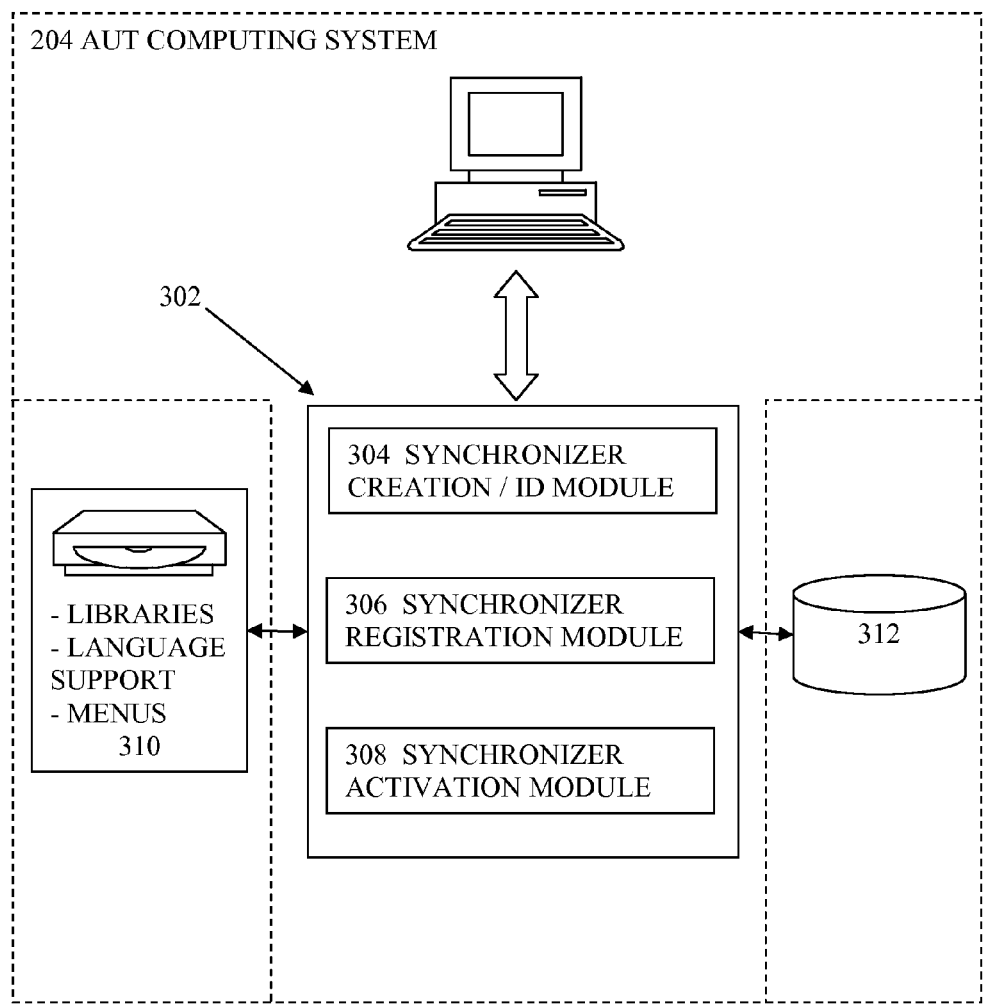
FIG. 3 illustrates a more detailed diagram of the architecture for performing tasks or operations on the application under test of FIG. 2.

FIG. 3 illustrates a more detailed diagram of the architecture for performing tasks or operations on the application under test of FIG. 2. The AUT computing system comprises a computer system which invokes or interacts with the first module 310 which may be part of the computing system 204 or may be remote to the computing system 204. The first module 310 comprises the libraries such as the programming language standard libraries. The first module 310 also provides programming language support for the testers or the synchronizer, API, or logic developers. In other words, the first module 310 provides support for the testers to write test cases or test flows or for the synchronizer, API, or logic developers to develop the needed synchronizers (which will be described in full details in subsequent paragraphs), API's, or various logic such as the wait logic.

The computing also invokes, executes, or interacts with the synchronizer module 302 which comprises the synchronizer creation or identification module 304, the synchronizer registration module 306, and the synchronizer activation module 308. The functions of the synchronizer module 302 will be described in full details in subsequent paragraphs with reference to various figures of this Application. The synchronizer module 302 interfaces or interacts with a storage system 312 which may be part of or may be remote to the AUT computing system 204. The storage system 312 stores thereupon data and information such as reusable synchronizers and others that may help the testers or the synchronizer, logic, or API to develop the necessary codes. The storage system 312 may be configured in the form of one or more permanent storage systems such a hard disk or some non-volatile media or one or more temporary storage systems such as certain volatile media.

Note that each individual module as described herein may be implemented in the form of pure software, pure hardware such as electronic circuitry, or a combination thereof. Also note that, as described in the previous paragraphs with reference to FIG. 2, the verification flow may be performed on a single computing node instead of in a multiple computing nodes configuration in some embodiments. In these embodiments, the AUT computing system further comprises the components, modules, and elements of the test bench 202.

Figure 4:
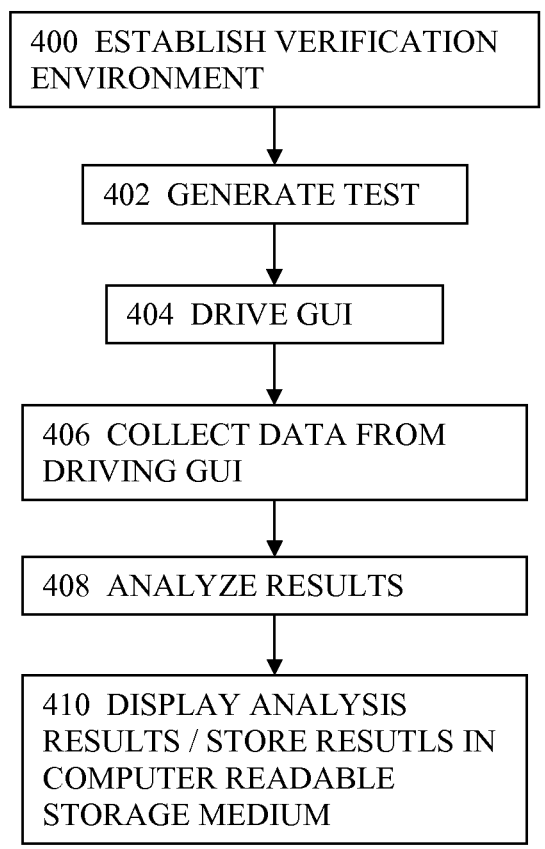
FIG. 4 illustrates a flowchart of a process for testing an interface according to some embodiments.

FIG. 4 illustrates a flowchart of a process for utilizing the architecture of FIG. 2. The process begins at 400 by establishing a verification environment (VE) for each application under test. This VE (which can be placed in a UI verification IP library), includes a set of "e" language files which define classes and behavior that are shared by all of the tests of the specific application. This methodology allows for a significant degree of code reuse. A VE may include, for example, at least 3 types of classes, and potentially many more. A number of application and functionality-specific tests are then authored in extended HVL language. These testbenches import or reference the AUT-specific VE defined in the verification IP libraries, in addition to more generically written non-AUT-specific verification IP that can verify more basic test level functionality. This more basic verification IP may also be placed in a verification IP library.

One example type of Verification Environment class or code behavior is a specific application launcher class. This class or code would allow the testbench author to launch the application using various methods, including a simple launch or a launch-with-command-line-arguments, and could easily be extended to handle additional launch requirements.

A second example type of class or code behavior is the specific application class. The application class inherits from the base application class and its methods relate to application specific logic, providing application window creation (constructor), initialization and query methods, in addition to other classes representative of the application's primary design architecture and logic. Further, in the case where the AUT supports a GUI in parallel to the GUI, the application class supports the required API.

A third example type of class comprises the various specific window classes, such as a main window class, any sub-window classes, etc, and reflects the various types of windows and sub-windows in the application, and their relationships. These classes further contain references to window-specific logic, including the various sub-widgets (such as trees, toolbars, buttons, etc.) comprising the window or sub-window.

The intent of these methods according to one embodiment is to create HVL language handles to AUT main window widgets only once. This reference is then returned anonymously, and it is that class method which is used in all tests that need to reference and manipulate objects such as windows, primary widgets, tree structures, etc. in the AUT application. Should that those objects get renamed or re-parented, the tests calling the method of the AUT main window application class will be unaffected. This is one of the advantages of the present invention, in which it provides a system in which specific application tests are insulated form various changes in the UI itself as the software evolves across releases.

At 402, the application test is created. The application test comprises a set of statements to test the UI written in a suitable verification language, such as the "e" language. API calls are embedded into the application test to drive the actions that are needed to test the UI. The embedded calls also provide the basis for generating query calls to check the state of the UI at various points in time and to obtain information about the UI. The application test may also incorporate or call other test components that may be stored in one or more libraries. Any UI element and component can be stimulated using the application test. The following are some example UI elements that can be tested in certain embodiments:

WINDOW,
BUTTON,
ACTION,
CHECKBOX,
RADIOBUTTON,
COMBOBOX,
LISTBOX,
TEXTBOX,
TEXTAREA,
LABEL,
TABCONTROL,
TABLE,
TABLE_ROW,
TOOLBAR_BUTTON,
MENU,
MENU_ITEM,
TREE,
TREE_ROW,
WINDOW
CANVAS,
SCROLLBAR,
IMAGE,
PANEL.
SPLIT_PANEL

The API would include a method/interface to address each of the supported UI elements. These methods would include mechanism to initialize, drive, manipulate, operate, and/or to query these elements.

At 404, the application test is processed by the verification engine to drive the UI being tested. In operation, the verification engine parses through the application test to identify the test instructions. The test instructions are communicated over a communications channel to the plug-in that is incorporated with the application under test. The plug-in translates the test instructions into the appropriate format suitable to the UI application. The translated test instructions are then applied to the UI to perform the specified test operations, which are essentially a set off operations that performs actions and functions within the UI.

Data collection instructions are processed at 406. This occurs by having the verification engine parse the application test to identify the specific types of information that are being sought by or for the test. A set of query commands would then be sent from the verification engine at the test side to the plug-in at the application side. The query commands would be processed by the plug-in to capture the requested information from the UI or to capture the state of some or all of the UI.

The collected data from the UI is then returned for analysis at 408. Analysis may be performed to determine whether the UI has properly performed the operations being tested by the application test. One approach to implement this action is to maintain a set of expected UI results for each test that is checked against the actual results of applying the test to the UI. Each test can receive a "pass" or "fail" indication depending upon whether the collected test results sufficiently matches the expected results.

At 410, the method or the system displays the analysis results on a display apparatus such as a monitor or stores the analysis results in a computer readable storage medium in some embodiments. A regression test manager product can also be used to facilitate display and analysis of the test results.

Figure 6:
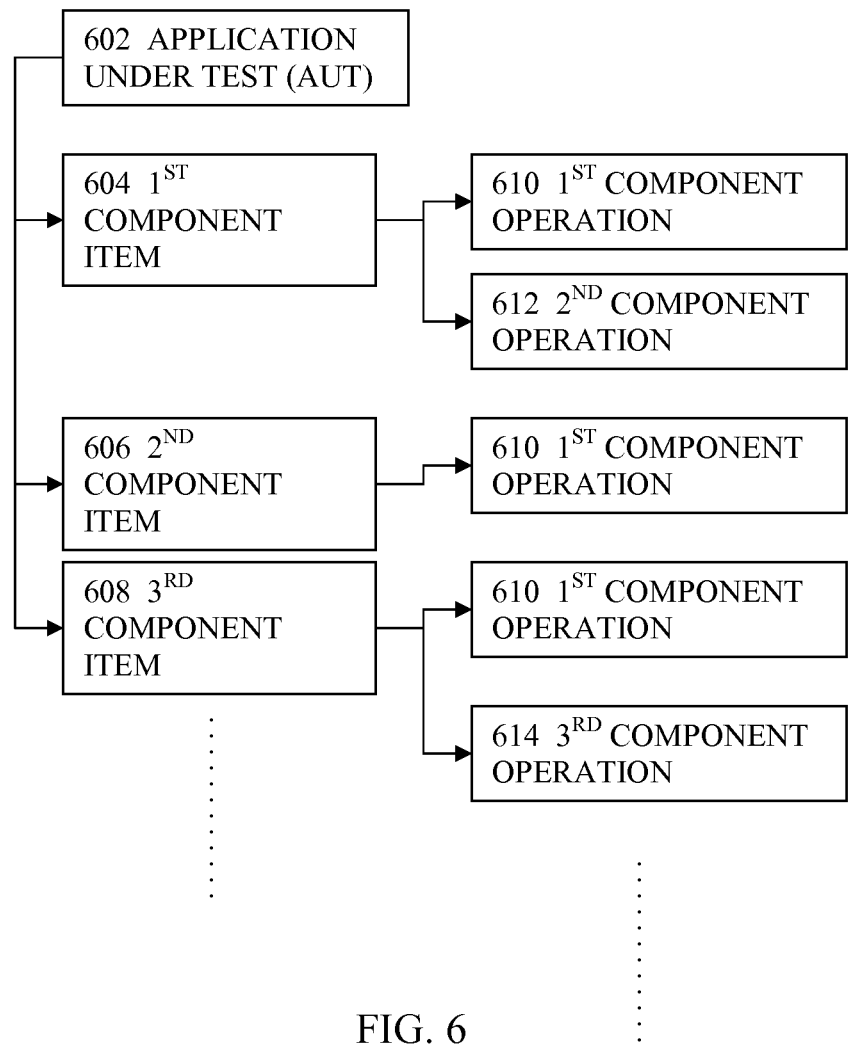
FIG. 6 illustrates an exemplary application under test with multiple component items and their respective component operations.

With reference to FIG. 6 which illustrates an exemplary application under test with multiple component items and their respective component operations, the application under test (AUT) comprises a plurality of component items such as component item 1, component item 2, component item 3, etc. Each of these components is associated with one or more component operations. An example of the component items comprises a dialog box asking to confirm a certain operation such as a dialog window with a "yes" button, a "no" button", and a "cancel" button. Another example of the component item is a menu item such as "File", "Edit", "View", "Help", etc. At least one of the component items comprises one or more sub-component item or sub-menu item such as "File-Open", "File-Save", etc., where the "Open" and "Save" items represent the sub-component items of the component items "File".

An operation or task involved with the UI testing that is usually executed on or in relation to a component item of the UI is thus collectively referred to as a component item. An example of the component operation is a click on the component item such as clicking on a particular menu item in the UI or on a particular button such as a "yes" button in a dialog window. Furthermore, a particular component operation may be associated with more than one component item. For example, the same clicking operation may be associated with multiple component items, sub-component items, menu-items, or sub-menu items (collectively menu items).

This is illustrated in FIG. 6 which shows that the application under test comprises the first menu item (604) which is associated with the first (610) and the second (612) component operation, the second menu item (606) which is associated with the first component operation (610), the third component item 608 which is associated with the first (610) and the third (614) component operations, etc. FIG. 6 shows only three component items with a total of five component operations. Nonetheless, an application under test may comprise many component operations to be tested during the UI testing. For example, even for a simple application such as the Microsoft® Wordpad® has much more menu items and 325 component operations to be tested or verified during the UI testing.

Figure 5:
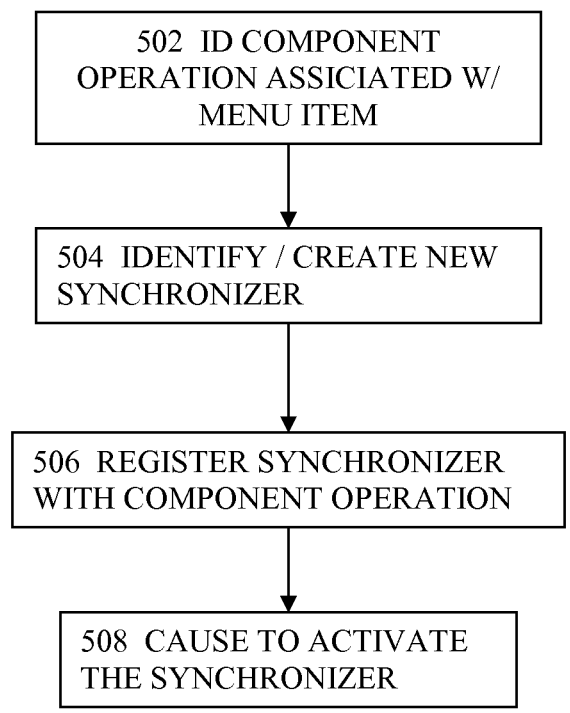
FIG. 5 illustrates a high level diagram for the process or hardware module for testing an application which uses a user interface.

With reference to FIG. 5 which illustrates a high level diagram for the process or hardware module for testing an application which uses a user interface, the method or the system for testing a user interface comprises the act or module of identifying a component operation which is associated with a menu item of the user interface at 502 in some embodiments.

The method or the system further comprises the act or module of identifying or creating a new synchronizer at 504. In some embodiments, the synchronizer resolves the synchronization or timing (collectively synchronization hereinafter) related issues between the application under test and the test tool such as the test bench 202.

In some embodiments, the synchronizer is developed or defined by a super user who possesses the knowledge of developing the logic, tasks, operations, or commands involved in the synchronizer and also the knowledge of the operations, interactions, and communications between applications under test and the test tools such as the test bench 202. In these embodiments, a general tester, a verification engineer, or a test flow writer (collectively tester) who is responsible for carrying out the UI testing need not possess such knowledge as the super user does. The tester or the verification engineer need not even be aware of contents of the synchronizer at all. In other words, various embodiments introduce a non-intrusive approach for testers who no longer need to deal with manually inserting the logic or some statements into the test flow. In some embodiments, the tester or the verification engineer may also develop or define such synchronizers for any component operations.

In various embodiments, the synchronizer needs to be defined only once and may be stored in a central repository such as a computer readable medium that is accessible by a plurality of testers and synchronizer developers so the synchronizers may be modified, shared, or reused. One of the advantages according to some embodiments is that the test case or the test flow itself needs not relate to synchronization or timing in any manner. In other words, no WaitFor statements, sleep statements, or any other synchronization related statements or commands need to be inserted into the test flow or the test case, and the tester needs only to focus on the flow of the test.

Another advantage according to some embodiments is that random testing of the user interface will also be synchronized because of the absence of the synchronization statements, logic, or commands from the test case or test flow. Yet another advantage according to some embodiments is regarding the reuse of the synchronizers. For example, there are 1000 tests for an application under test. There could be 20 specific component-operations that need synchronization and suppose 500 tests (out of the 1000) are exercising one or more of these 20 component-operations. In this case, there only need to be 20 synchronizers (one per component-operation), irrespective of the number of tests. The number of tests could increase but the synchronizers will not be re-written for a component-operation. If the tests are to be carried out without the use of Synchronizers, the synchronization logic will have to be replicated 500 times. As the tests increase, this effort of replicating the logic also increases.

The synchronizer is developed for a particular component operation or a class of component operations which belong to a super class and share certain common attributes such that a single synchronizer may be used to capture these common attributes in some embodiments. The synchronizer may also be associated or attached to one or more component operations according to one or more synchronization requirements in some embodiments. In various embodiments, the synchronizer is activated automatically when the associated component operation is invoked or executed. In some embodiments, the synchronizer is activated automatically irrespectively of the test in which the synchronizer is executed. Further details about defining or developing the synchronizer will be described in greater details in the subsequent sections.

Figure 7A:
FIG. 7A illustrates an exemplary graphical user interface for testing.

For example, FIG. 7A illustrates an exemplary graphical user interface for testing. FIG. 7A shows an exemplary application for a bank's online application where a list of customers is maintained in a database. The list of the customers also comprises columns such as "Name" of the customer, "Title", "City", "Country", and "Account Size". The window also comprises two buttons "Sort by Name" and "Sort by Account Size".

According to some embodiments, the super user or the verification engineer may define or develop two synchronizers and associate them with the click operation of both sorting buttons. The synchronizer comprises logic to wait for the data in the table to change in order to ensure that the sort operation has completed before the AUT receives the next operation for testing. In this example, the tester needs only worry about the flow of the UI testing instead of the synchronizer, the logic thereof, or any synchronization related issues.

According to some embodiments, the respective synchronizer is activated as soon as the corresponding "Sort" button is clicked (in simulation). The logic in the corresponding synchronizer prevents the test from moving to the next checkpoint or stage until the data in the table has changed. In other words, the synchronizer performs the function of checking to determine whether a certain condition has been fulfilled and whether it is safe to proceed with the test.

In some embodiments, the synchronizer relinquishes control only after the condition has been fulfilled—the data in the table have changed in this example. That is, the synchronizer ensures that the test bench waits for a certain state or an exact amount of time no more and no less than necessary that marks the completion of the operation that needs synchronization—the click of a button in this example. It shall be noted that the logic for synchronization is part of the synchronizer and is therefore executed whenever the associated component operation is triggered, invoked, or executed.

Figure 7B:
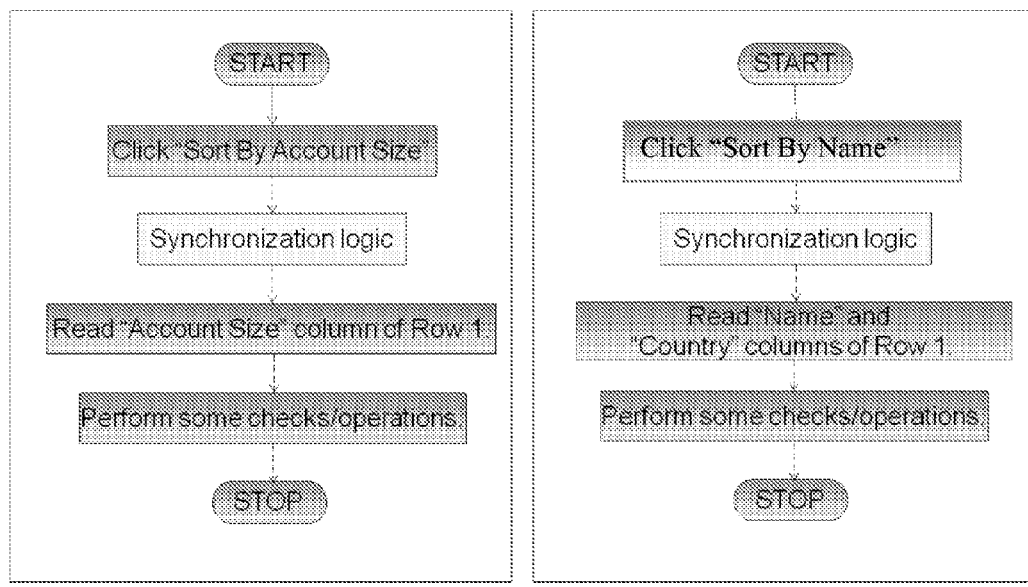
FIG. 7B illustrates the flows of testing the exemplary graphical user interface of FIG. 7A.

FIG. 7B illustrates graphical representation of the UI testing simulating the click of the "Sort by Account Size" button. The test flow starts with "Start" which marks the beginning of the test. The test flow proceeds to "Click 'Sort by Account Size'" button. The synchronization logic in the corresponding synchronizer intervenes and takes control of the test to prevent the test from proceeding to the next stage or check point. Then the "Account Size" column of Row 1 is read, and some checks or operations are performed to determine whether a particular state has been reached (in this example, whether the data in the table have changed). If the particular state has been reached the synchronizer relinquishes control so the test bench may proceed to the next check point or stage. In this illustration, no further testing is performed so the test proceeds to "Stop".

Figure 8:
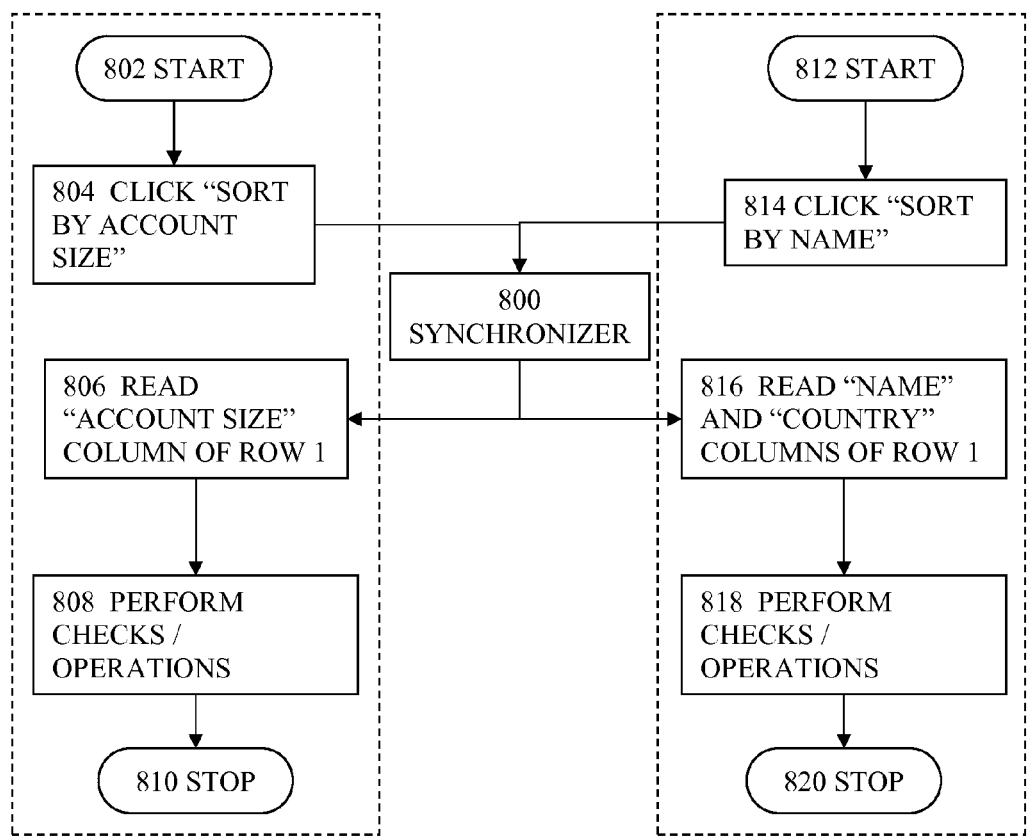
FIG. 8 illustrates an exemplary application of the process or module as illustrated in FIG. 5 to the exemplary graphical user interface in FIG. 7A.

This part of the test flow in FIG. 7A is further illustrated in the left-hand portion of FIG. 8 where the test flow starts at 802 and proceeds to 804 where the test simulates the clicking on the "Sort by Account Size". The synchronizer 800 is activated as soon as the "Sort by Account Size" button is clicked upon. The activation of the synchronization is activated implicitly without requiring the tester to perform any further actions in some embodiments.

Once activated, the synchronizer 800 intervenes and takes control of the test to prevent the test bench from proceeding to the next check point or stage. The synchronizer then causes to read the "account size" column of row 1 at 806 to perform some checks or operations at 808 to determine whether a certain state has been reached (for example, whether the data in the table have changed). If the test has reached the certain state the synchronizer relinquishes the control and the test proceeds to stop at 810 because no further testing is to be performed. Note that in this example, both the "name" and "country" columns of row 1 are read. Nonetheless, the checks or operations may be performed with only one column of any row in some embodiments. In other embodiments, more than two columns of any row may be used for the checks or operations at 808 and 818.

FIG. 7B further illustrates graphical representation of the UI testing simulating the click of the "Sort by Name" button. The test flow starts with "Start" which marks the beginning of the test. The test flow proceeds to "Click 'Sort by Name'" button. The synchronization logic in the corresponding synchronizer intervenes and takes control of the test to prevent the test from proceeding to the next stage or check point. Then the "Name" and "Country" columns of Row 1 are read, and some checks or operations are performed to determine whether a particular state has been reached (in this example, whether the data in the table have changed). If the particular state has been reached the synchronizer relinquishes control so the test bench may proceed to the next check point or stage. In this illustration, no further testing is performed so the test proceeds to "Stop".

This part of the test flow in FIG. 7A is further illustrated in the right-hand portion of FIG. 8 where the test flow starts at 812 and proceeds to 814 where the test simulates the clicking on the "Sort by Name". The synchronizer 800 is activated as soon as the "Sort by Account Size" button is clicked upon. The activation of the synchronization is activated implicitly without requiring the tester to perform any further actions in some embodiments.

Once activated, the synchronizer 800 intervenes and takes control of the test to prevent the test bench from proceeding to the next check point or stage. The synchronizer then causes to read the "name" and "country" columns of row 1 at 816 to perform some checks or operations at 818 to determine whether a certain state has been reached (for example, whether the data in the table have changed). If the test has reached the certain state the synchronizer relinquishes the control and the test proceeds to stop at 820 because no further testing is to be performed. Note that in this example, both the "name" and "country" columns of row 1 are read. Nonetheless, the checks or operations may be performed with only one column of any row in some embodiments. In other embodiments, more than two columns of any row may be used for the checks or operations at 808 and 818.

Referring back to FIG. 5, the method or the system for UI testing may further comprise the act or module of registering the synchronizer with the associated component operation at 506 in some embodiments. Further details about registering the synchronizer will be described in greater details in subsequent paragraph(s) and figure(s).

The method or the system for UI testing may further comprise the act or module of causing to activate the synchronizer at 508 in some embodiments. Further details about registering the synchronizer will be described in greater details in subsequent paragraph(s) and figure(s).

One of the advantages of various embodiments is that the tests are highly stable in that the tests are independent of the changes in the application or even changes in the performance or workload of the system(s) involved in the test because the synchronizer(s) ensures that the tests do not proceed until tests are ready to proceed to the next stage or check point. Another advantage is that the tests are reliable in that the tests will not produce false positives or false negatives because of the use of synchronizers. Another advantage is that the tests do not waste unnecessary amount of resources or time because the synchronizer may be configured to intervene a precise amount of time that is no longer than necessary.

Another advantage is that a synchronizer needs only be defined once for a component operation and is stored in a central repository to greatly enhance reusability. Another advantage is that the maintainability of the tests is greatly enhanced in that changes may be incorporated into the corresponding synchronizers once and for all rather than changing the repetitive synchronization logic in many places in the test cases or the test flows. Another advantage according to some embodiments is that random testing or random scenarios may be synchronized because the synchronizers are activated when the respective triggering events are called.

Figure 9A:
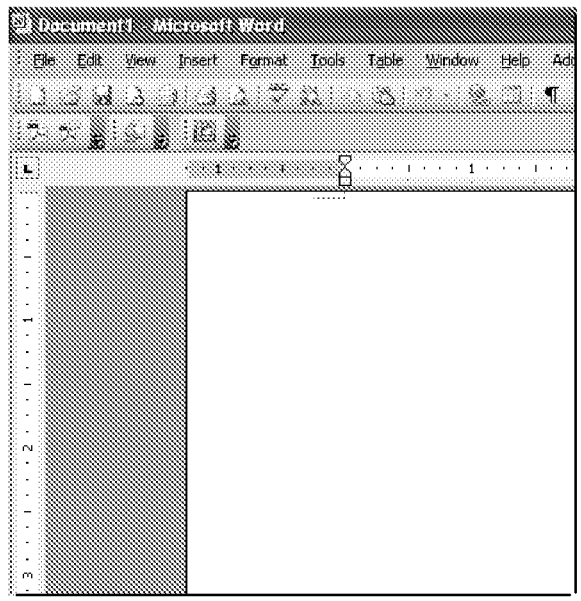
FIGS. 9A-C illustrate another exemplary user interface for testing to which various methods or systems apply according to some embodiments.
Figure 9B:
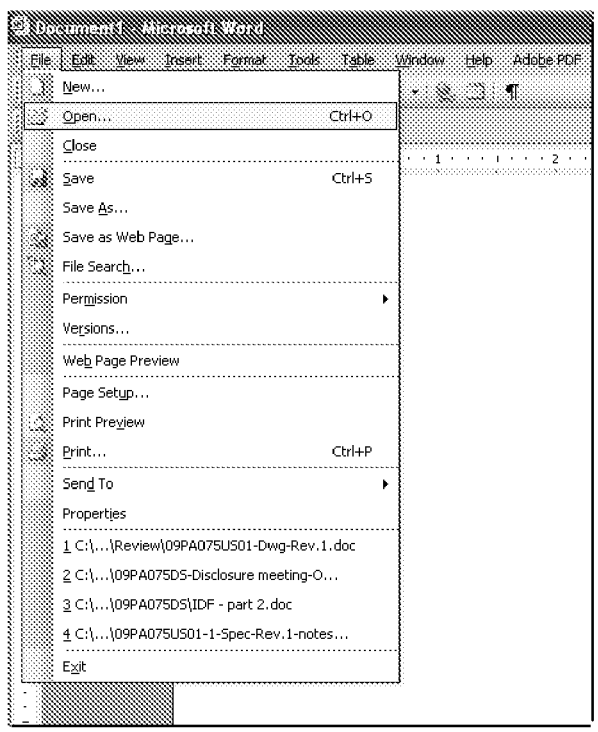
Figure 9C:
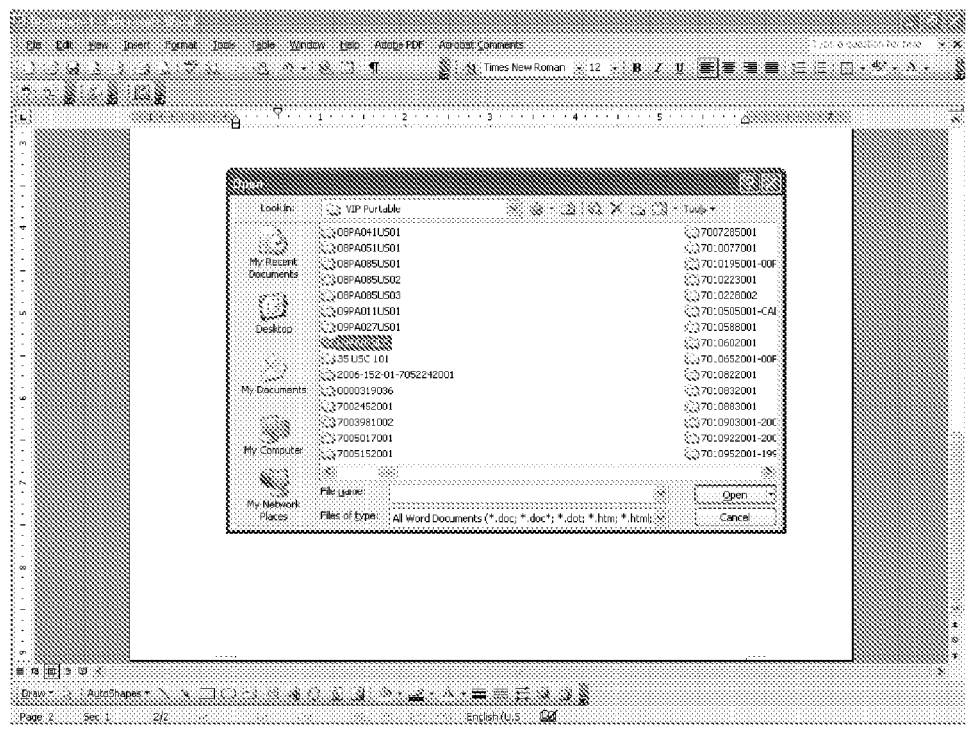

FIG. 9A-C illustrate another exemplary user interface for testing to which various methods or systems apply according to some embodiments.

FIG. 9A illustrates a portion of a Microsoft Word® application window with part of the menu which comprises the menu item "File". FIG. 9B illustrates the click on the File menu which brings up the sub-menu items of the File menu item such as "New", "Open", "Close", "Save", "Save As . . . ", etc. FIG. 9C further illustrates the click on the "File-Open" sub-menu item which brings up a dialog box showing the contents of a certain directory.

During the UI testing of this type of Application, the test bench needs to wait at various stages of the test. For example, the test bench needs to wait for the sub-menu items in the File menu to show up after the click on the File menu item. The test bench also needs to wait for the dialog box with the directory contents to show up after the "File-Open" sub-menu item is clicked upon. The wait, especially the wait for the dialog box to show up may take a significant amount of time depending on the size of the contents, the performance of the system(s), or the workload of the system(s) involved in the testing.

Figure 10:
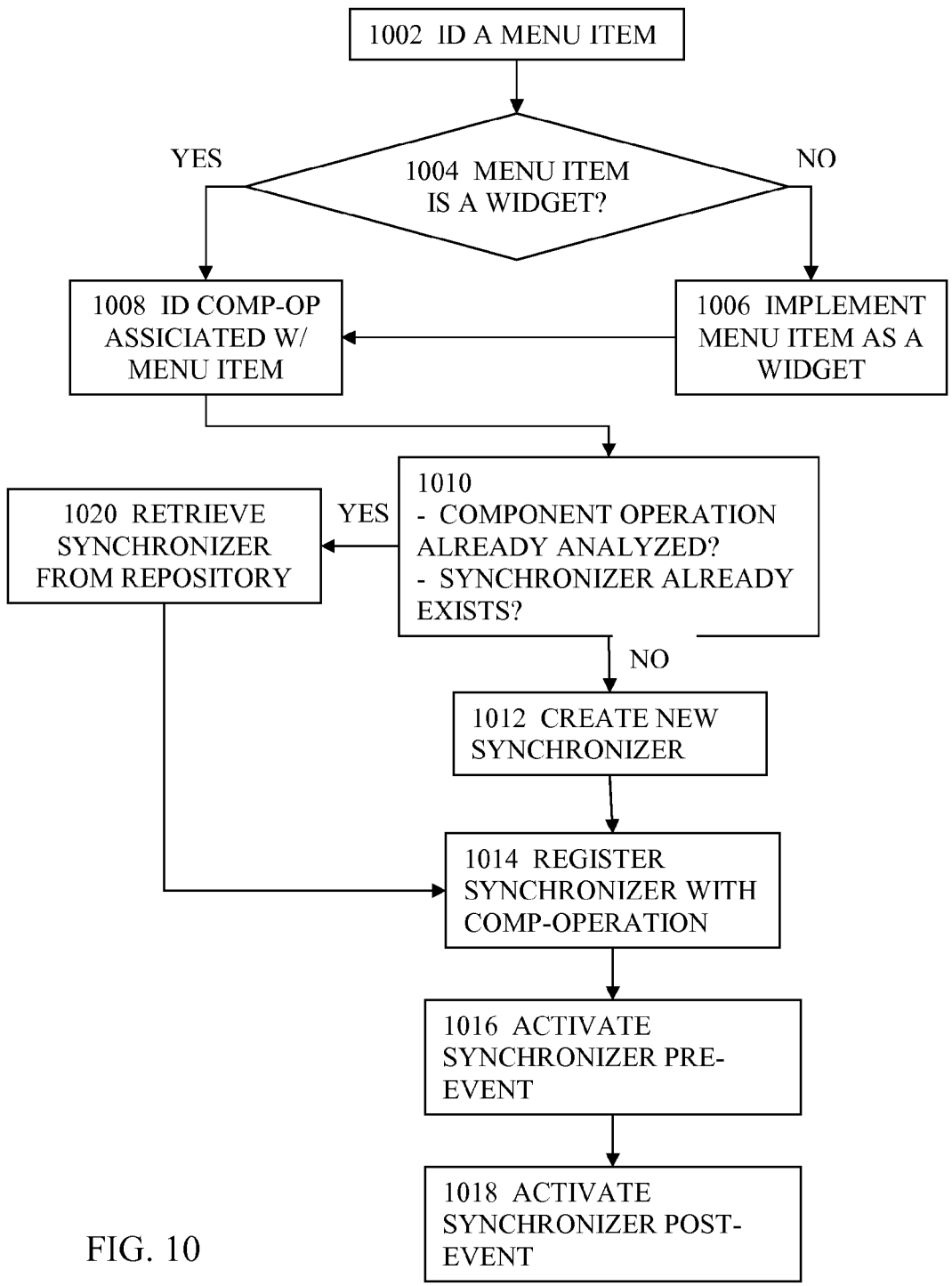
FIG. 10 illustrates a more detailed diagram for the method or system for testing an application which uses a user interface according to some embodiments.

With reference to FIG. 10 which a more detailed diagram for the method or system for testing an application which uses a user interface according to some embodiments, the method or the system for UI tests comprises the act or module of identifying a menu item at 1002. The method or the system may further comprise the act or module of determining whether the menu item has been implemented as a widget (or a window gadget) for the test bench at 1004 in some embodiments.

A widget comprises an interactive component of a user interface that displays an information arrangement that may be modified or altered by a user in some embodiments. A widget comprises a characteristic of providing one or more interaction points for direct manipulation (a human-computer interaction involving representation of objects of interest, actions, and feedback) of data in these embodiments. In other words, a widget holds the data processed by an application and the available interactions on such data.

A widget may be generic and thus commonly reusable. Such a generic widget may comprise a plurality of different implementations to form a widget toolkit which may then be used to build a user interface through the use of, for example, application programming interfaces (APIs). Typical examples of widgets comprise buttons, sliders, list boxes, spinners, drop-down lists, menus, toolbars, combo boxes such as text boxes with attached menus or list boxes, icons, tree views, grid views, tabs, scroll bars, tooltips, labels, balloon help, windows, dialog boxes, progress bar, status bars, information bars, etc.

Where the method or the system determines that the menu item of interest has not been implemented as a widget in some embodiments, the method or the system implements the menu item as a widget at 1006 and then proceeds to 1008. Where the method or the system determines that the menu item of interest has already been implemented as a widget in some embodiments, the method or the system comprises the act or the module of identifying a component operation associated with the menu item at 1008. The method or the system further comprises the act or module of determining whether the component operation has already been processed to be associated with a synchronizer or whether the synchronizer for the component operation already exists at 1010.

Where the method or the system determines that the synchronizer already exists at 1010 in some embodiments, the method or the system further comprises the act or module of retrieving the synchronizer at 1020 and then proceeds to 1014. In one embodiment, the method or the system retrieves the synchronizer form a central repository that is shared among different test cases. Where the method or the system determines that the synchronizer does not exist at 1010 in some embodiments, the method or the system further comprises the act or module of creating a new synchronizer at 1012. The method or the system for UI testing further comprises the act or module of registering the synchronizer with the component operation for the menu item at 1014 in some embodiments.

The method or the system for UI testing further comprises the act or module of activating the synchronizer pre-event at 1016 or the act or module of activating the synchronizer post-event at 1018 in some embodiments. The act or module of activating the synchronizer pre-even at 1016 allows the tester or the super user to design pre-event operations such as some tests or operations that need to be performed before the next operation or task may be invoked or executed in some embodiments. For example, these pre-event operations comprise the clicking on a button to identify a change in data such as a click on the "Sort by Account Size" button in the above examples. The act or module of activating the synchronizer post-event at 1018 allows the tester or the super user to design post-event operations that follows a certain operation or task. For example, the post-event operations may comprise bringing up windows, dialog boxes, or calling one or more sub-operations.

Figure 11:
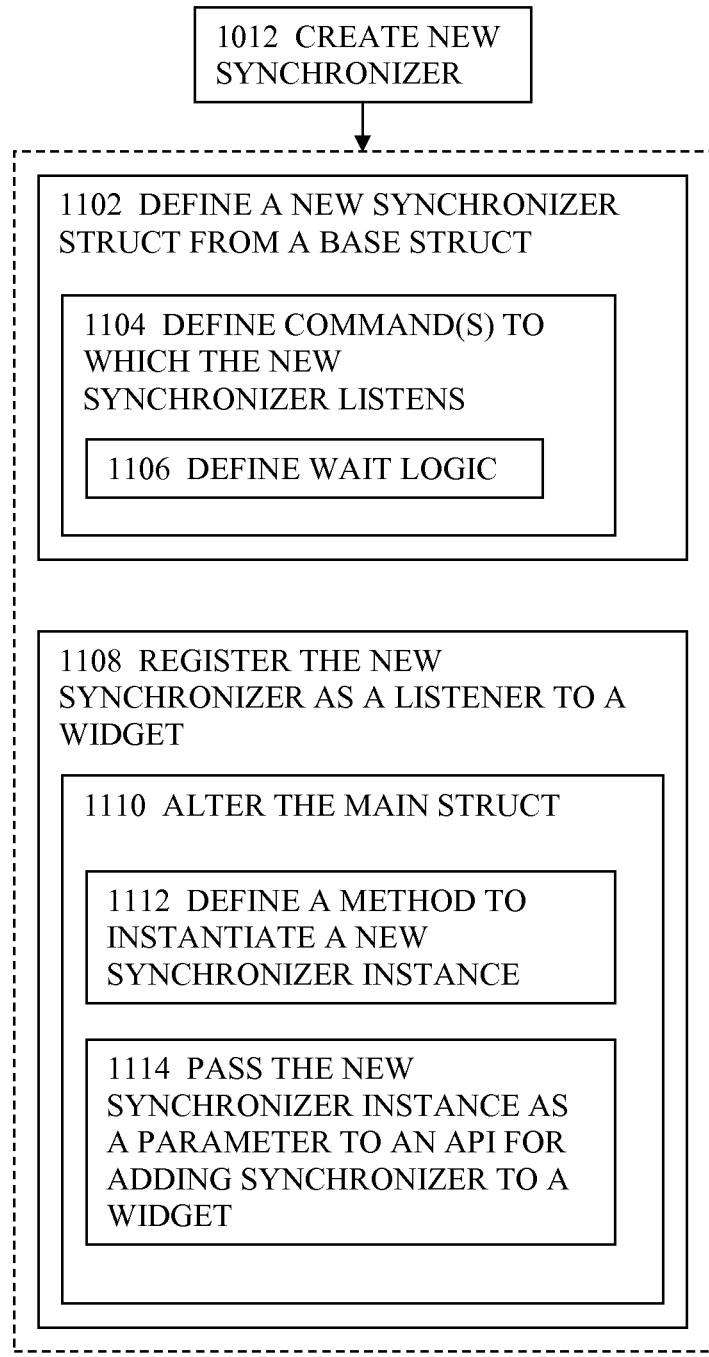
FIG. 11 illustrates a more detailed diagram for the creating new synchronizer sub-process or a sub-module in FIG. 10 according to some embodiments.

With reference to FIG. 11 which illustrates a more detailed diagram for the creating new synchronizer sub-process or a sub-module in FIG. 10 according to some embodiments, the method or the system may comprise the act or module of defining a new synchronizer struct from a base struct 1102. A struct is commonly known and used in programming languages such as the e programming language to define data elements and behavior of components of a test environment. A struct may hold all types of data and methods. Moreover, for reusability, struct members may be added to a previously defined a struct, and the behavior of a struct may be altered with specific programming commands such as "extend" in e programming language. In e programming language, a struct may be defined by using the syntax of struct struct-type: struct-descriptor [like base-struct-type: struct-descriptor]{[member: struct-member; . . . ]}

The base struct type represents the type of the struct from which the new struct inherits its members.

The act or module of defining a new synchronizer struct from a base struct 1102 comprises defining one or more commands to which the new synchronizer listens (1104) which may further comprise the act or module of defining the wait logic (1106).

The act or module of creating a new synchronizer at 1012 may also comprise the act or module of registering the new synchronizer as a listener to a widget (1108). The act or module 1108 comprises the act or module of altering the main struct (1110) to change its behavior or to add one or more members to the main struct. The act or module of altering the main struct (1110) further comprises defining one or more methods to instantiate a new synchronizer instance (1112) and the act or module of passing the new synchronizer instance as a parameter to a standard or custom application programming interface for adding the synchronizer to the widget (1114).

The following exemplary codes demonstrate the act or module of creating a new synchronizer at 1102 on a GTX test tool.

```
L1. struct file_chooser_synchronizer like gtx_base_syn-
    chronizer {
L2. sync_menu_item_click(menu_item: gtx_menu_item,
L3. pre_op_data: any_struct) is also {
L4. var my_application: gtx_app=menu_item.get_app( );
L5. my_application.wait_for_window(file_chooser, 60);
L6. };
L7. };
```

Note that L1 defines the new struct "file_chooser_synchronizer" from the base struct type "gtx_base_synchronizer" from which the new struct inherits its members. L2-3 indicate that the proper command(s) to which the synchronizer "listens". L4-5 indicate the wait logic for the synchronizer associated with the component operation.

The following exemplary codes demonstrate the act or module of registering the new synchronizer as a listener to a widget at 1108 on a GTX test tool. Note that these codes are subject to copyright protection, and that the copyright owner has no objection to the facsimile reproduction by anyone of the patent document or the patent disclosure, as it appears in the Patent and Trademark Office patent file or records, but otherwise reserves all copyright rights whatsoever.

```
L1. extend main_window {
L2. post_init( ) is also {
L3. get_file_open_menu_item( ).add_synchronizer(
L4. new file_chooser_synchronizer);
L6. };
L7. };
```

Note that the main struct "main_window" is modified by the "extend" command in L1. A new instance of the synchronizer is instantiated with the "new" command in L4 and is passed to the method "get_file_open_menu_item( ).add_synchronizer" as a parameter in L3. Also note that the code is done once and is initiated (after the main window is initialized) within the method "post_init( )".

Figure 12:
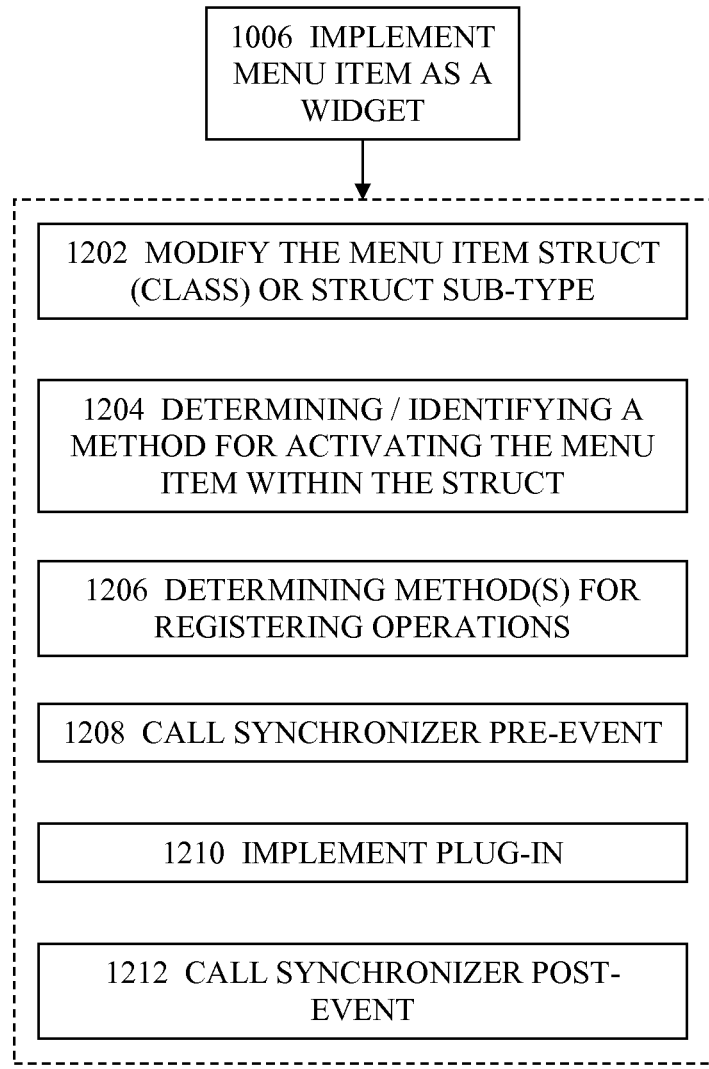
FIG. 12 illustrates a more detailed diagram for implementing a user interface component or a menu item as a widget in FIG. 10 according to some embodiments.

With reference to FIG. 12 which illustrates a more detailed diagram for implementing a user interface component or a menu item as a widget in FIG. 10 according to some embodiments, the act or module of implementing the menu item as a widget comprises the act or module of modifying the menu item struct or struct sub-type at 1202 to alter its behavior or to add members to it.

The method or the system further comprises the act or module of determining or identifying a method for activating the menu item within the struct at 1204 and the act or module of determining or identifying a method for registering one or more user operations at 1206 in some embodiments. The method or the system may further comprise the act or module of calling the synchronizer pre-event at 1208 and the act or module of implementing one or more plug-ins at 1210 in some embodiments. The method or the system may further comprise the act or module of calling the synchronizer post-event at 1212 in some embodiments.

The following exemplary codes demonstrate the act or module of implementing a user interface component or a menu item as a widget at 1006 on a GTX test tool. Note that these codes are subject to copyright protection, and that the copyright owner has no objection to the facsimile reproduction by anyone of the patent document or the patent disclosure, as it appears in the Patent and Trademark Office patent file or records, but otherwise reserves all copyright rights whatsoever.

```
L1. extend gtx_menu_item {
L2. get_model( ): gtx_menu_item_model is
L3. ensure_model_data( );
L4. return m_model.as_a(gtx_menu_item_model);
L5. };
L6. private ensure_model_data( ) is
L7. if (m_model==NULL) {
L8. m_model=NEW gtx_menu_item_model.ctor(me);
L9. };
L10. };
L11. post_init( ) is also {
L12. m_widget_kind=MENU_ITEM;
L13. };
L14. //COMMANDS
L15. do_click( ) is only {
L16. //REGISTER USER OP
L17. var attr_set: gtx_attribute_set=new gtx_attribute_set;
L18. var user_op: gtx_user_op_details=.
L19. gtx.register_user_op(me, MENU_ITEM_CLICK,
    attr_set, "do_click( );");
L20. gtx.fire_pre_operation(user_op);
L21. //CALL SYNCHRONIZER PRE-EVENT
L22. var all_synchronizer_containers: list of gtx_synchro-
    nizer container=get_all_synchronizer_containers( );
L23. for each (cont) in all_synchronizer_containers {
L24. cont.set_pre_op_data(
L25. cont.get_synchronizer( ).pre_menu_item_click(
    me));
L26. }
L27. //PLUGIN IMPL
L28. var params: gtx_params_holder=NULL;
L29. widget_do_cmd("click", params);
L30. gtx.fire_post_operation(user_op);
L31. //CALL SYNC-POST-EVENT
L32. for each (cont) in all_synchronizer_containers {
L33. cont.get_synchronizer( ).sync_menu_item_click(
L34. me, cont.get_pre_op_data( );
L35. };
L36. };
```

Note that the test tool ensures a call to the synchronizer pre-event in L21-26 before actually firing the click operation on the menu item starting in L27. Furthermore, the synchronizer post-event is called in L31-34 after the click operation starting in L27. In addition, the "gbx_menu_item_model" represents the return-type of the method "get_model( )" as shown in L2. The text enclosed with double forward slashes ("//") denote comments.

System Architecture Overview

Figure 13:
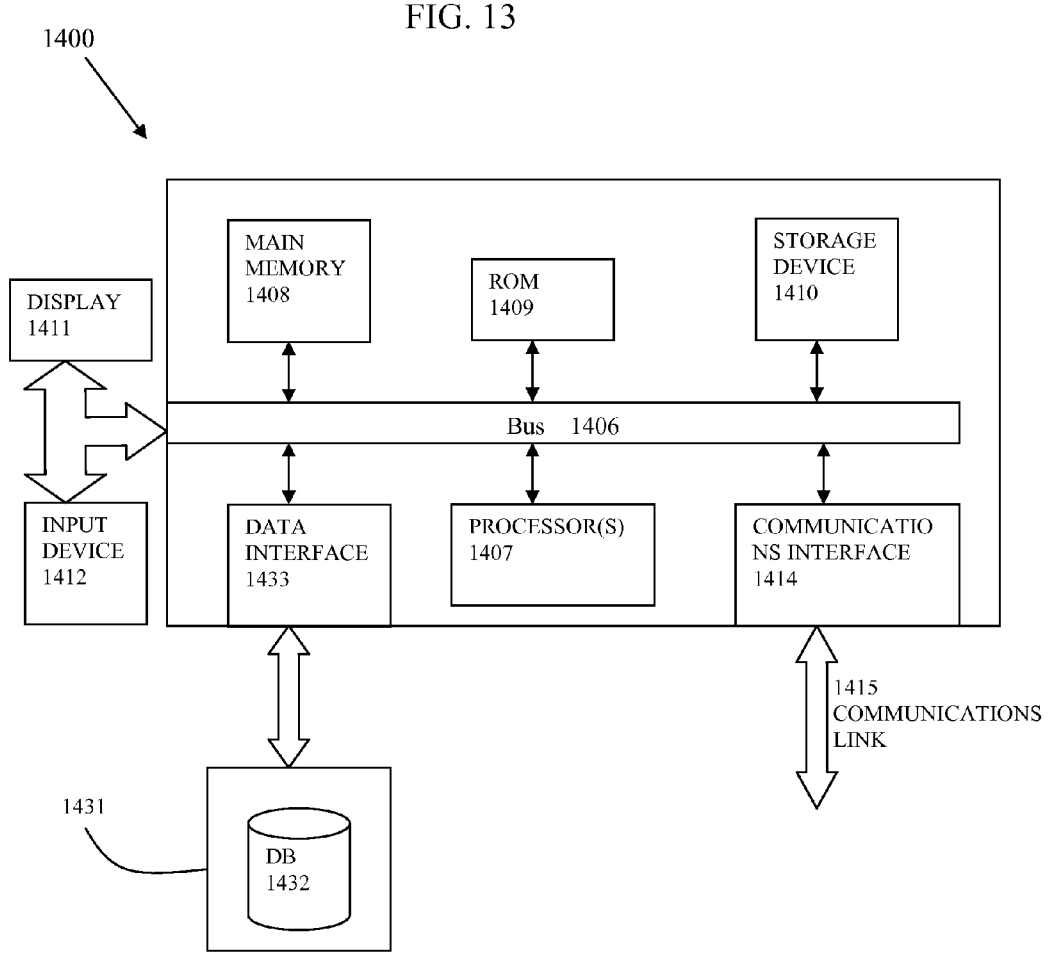
FIG. 13 illustrates a block diagram of an illustrative computing system 1400 suitable for implementing various embodiment of the invention

FIG. 13 illustrates a block diagram of an illustrative computing system 1400 suitable for implementing various embodiment of the invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by one or more processors or processor cores 1407 executing one or more sequences of one or more instructions contained in system memory 1408. Such instructions may be read into system memory 1408 from another non-transitory computer readable/usable storage medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software.

In one embodiment, the term "logic" shall mean any combination of software or hardware that is used to implement all or part of the invention. In the single embodiment or in some embodiments, the one or more processors or processor cores 1407 may be used to perform various acts such as various acts involving determining, identifying, analyzing, generating, establishing, registering, causing to activate, simulating, etc. In some embodiments, at least one of the one or more processors or processor cores 1407 has the multithreading capability to execute a plurality of threads to perform various tasks as described in the preceding sections.

Various actions as described in the preceding paragraphs may be performed by using one or more processors, one or more processor cores, or combination thereof 1407. For example, the act of defining, identifying, or determining one or more criteria for hotspots or metrics, the act of determining when or whether further optimization is necessary or desired, the act of determining the hints, the act of determining which correction candidate(s) to apply, the act of determining whether the temporary modifications or fixes are desirable, the act of determining whether there remain some hotspots or whether the metrics are acceptable or desired, the act of determining whether further optimization or repair is required or desired, etc. may be performed by one or more processors, one or more processor cores, or combination thereof.

The term "non-transitory computer readable storage medium" or "non-transitory computer usable storage medium" as used herein refers to any non-transitory storage medium that participates in providing instructions to processor 1407 for execution. Such a non-transitory medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable storage media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals that include data streams representing various types of signal information, e.g., instructions, messages and data. In embodiments of the invention, the functions of the data interface 1433 may be performed by the communication interface 1414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for synchronizing a software verification flow, the method comprising:
    using a computer system which comprises at least one processor to perform a process, the process comprising:
        identifying a component operation associated with a menu item of a user interface, wherein the component operation includes an element to be tested in the software verification flow and represents an act of triggering the menu item in the user interface;
        identifying or creating a synchronizer;
        registering the synchronizer with the component operation;
        synchronizing the software verification flow by using the synchronizer, without including wait statements in the software verification flow to instruct the software verification flow to pause execution and to wait for a particular state to proceed with verification.

2. The computer implemented method of claim 1, wherein the act of synchronizing comprises determining whether a criterion has been fulfilled, and
    the criterion comprises an occurrence of a state that indicates completion of the component operation.

3. The computer implemented method of claim 2, wherein the act of synchronizing comprises taking control of the software verification flow by using the synchronizer until the criterion has been fulfilled.

4. The computer implemented method of claim 2, wherein
the act of synchronizing prevents the software verification flow to proceed to a next stage until the criterion is fulfilled; and
the act of synchronizing is performed without placing a synchronization requirement into a test case of the software verification flow.

5. The computer implemented method of claim 1, wherein the act of synchronizing is performed automatically without human manipulation of the software verification flow.

6. The computer implemented method of claim 2, wherein
the act of synchronizing causes the software verification flow to wait for an amount of time, and
the amount of time is no more or no less than what is necessary to conserve computing resources.

7. The computer implemented method of claim 1, wherein the act of identifying or creating the synchronizer comprises:
defining a synchronizer struct for the synchronizer from a base struct, in which the act of defining the synchronizer struct comprises defining one or more commands to which the synchronizer listens.

8. The computer implemented method of claim 7, wherein the act of defining the one or more commands comprises:
defining a wait logic for the synchronizer struct.

9. The computer implemented method of claim 8, wherein the act of identifying or creating the synchronizer comprises:
registering the synchronizer as listener to the menu item.

10. The computer implemented method of claim 7, further comprising:
defining a method for instantiating an instance of the synchronizer struct; and
passing the instance as a parameter to an application programming interface for the act of registering the synchronizer with the component operation.

11. The computer implemented method of claim 1, further comprising:
causing the synchronizer to be activated, wherein
the synchronizer is stored in a central repository to be reused for one or more other software verification flows, and
the synchronizer is activated when the component operation is invoked in the software verification flow.

12. The computer implemented method of claim 1, wherein the act of registering the synchronizer with the component operation occurs only once for a first occurrence of the component operation but not for subsequent occurrences of the component operation in the software verification flow.

13. The computer implemented method of claim 11, wherein the act of causing the synchronizer to be activated further comprises:
causing a synchronizer pre-event to be activated before invoking the component operation in the software verification flow, or
causing a synchronizer post-event to be activated after invoking the component operation in the software verification flow.

14. The computer implemented method of claim 1, further comprising:
implementing the menu item as a widget for the user interface.

15. The computer implemented method of claim 14, wherein the act of implementing the menu item as a widget comprises:
creating or modifying a menu item struct;
identifying or determining a method for activating the menu item within the menu item struct;
determining a second method for registering one or more operations for the menu item struct; and
implementing one or more plug-ins.

16. The computer implemented method of claim 15, further comprising:
calling one or more synchronizer pre-event operations before implementing the one or more plug-ins; and
calling one or more synchronizer post-event operations after implementing the one or more plug-ins.

17. The computer implemented method of claim 15, wherein the one or more plug-ins invoke the method for activating the menu item in the software verification flow.

18. A machine for synchronizing a software verification flow, the machine comprising:
a computer system which comprises at least one processor that is at least to:
identify a component operation associated with a menu item of a user interface, wherein the component operation includes an element to be tested in the software verification flow and represents an act of triggering the menu item in the user interface;
identify or creating a synchronizer;
register the synchronizer with the component operation; and
synchronize the software verification flow by using the synchronizer, without including wait statements in the software verification flow to instruct the software verification flow to pause execution and to wait for a particular state to proceed with verification.

19. An article of manufacture of a computer program product comprising a non-transitory computer readable storage medium having a sequence of instructions which, when executed by a computer system, cause the one or more processors, processor cores, or combination thereof to execute a method for synchronizing a software verification flow, the method comprising:
using the computer system which comprises at least one processor and is configured for performing a process, the process comprising:
identifying a component operation associated with a menu item of a user interface, wherein the component operation includes an element to be tested in the software verification flow and represents an act of triggering the menu item in the user interface;
identifying or creating a synchronizer;
registering the synchronizer with the component operation; and
synchronizing the software verification flow by using the synchronizer, without including wait statements in the software verification flow to instruct the software verification flow to pause execution and to wait for a particular state to proceed with verification.

20. The machine of claim 18, wherein the at least one processor that is to identify or create the synchronizer is further to:
cause the synchronizer to be activated, wherein
the synchronizer is stored in a central repository to be reused for one or more other software verification flows, and
the synchronizer is activated when the component operation is invoked in the software verification flow.

21. The machine of claim 18, wherein the at least one processor that is to define the synchronizer struct is further to:
implement the menu item as a widget for the user interface.

22. The machine of claim 21, wherein the at least one processor that is to implement the menu item as a widget is further to:

create or modify a menu item struct;
identify or determine a method for activating the menu item within the menu item struct;
determine a second method for registering one or more operations for the menu item struct; and
implement one or more plug-ins.

23. The machine of claim 22, wherein the at least one processor is further to:
call one or more synchronizer pre-event operations before implementing the one or more plug-ins; and
call one or more synchronizer post-event operations after implementing the one or more plug-ins.

24. The article of manufacture of claim 19, wherein the act of identifying or creating the synchronizer comprises:
causing the synchronizer to be activated, wherein
the synchronizer is stored in a central repository to be reused for one or more other software verification flows, and
the synchronizer is activated when the component operation is invoked in the software verification flow.

25. The article of manufacture of claim 24, wherein the act of defining the synchronizer struct further comprises:
implementing the menu item as a widget for the user interface.

26. The article of manufacture of claim 25, wherein the act of implementing the menu item as a widget comprises:
creating or modifying a menu item struct;
identifying or determining a method for activating the menu item within the menu item struct;
determining a second method for registering one or more operations for the menu item struct; and
implementing one or more plug-ins.

27. The article of manufacture of claim 26, wherein the process further comprises:
calling one or more synchronizer pre-event operations before implementing the one or more plug-ins; and
calling one or more synchronizer post-event operations after implementing the one or more plug-ins.

* * * * *